US010552692B2

(12) United States Patent
AlRegib et al.

(10) Patent No.: US 10,552,692 B2
(45) Date of Patent: Feb. 4, 2020

(54) COLOR LEARNING

(71) Applicants: Ford Global Technologies, LLC, Dearborn, MI (US); Georgia Tech Research Corporation, Atlanta, GA (US)

(72) Inventors: Ghassan AlRegib, Johns Creek, GA (US); Min-Hung Chen, Decatur, GA (US); David McCreadie, Ann Arbor, MI (US); Daniel Lewis Boston, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 15/708,623

(22) Filed: Sep. 19, 2017

(65) Prior Publication Data
US 2019/0087671 A1 Mar. 21, 2019

(51) Int. Cl.
G06K 9/00 (2006.01)
G06K 9/62 (2006.01)
G06K 9/46 (2006.01)
H04N 1/60 (2006.01)

(52) U.S. Cl.
CPC ....... *G06K 9/00818* (2013.01); *G06K 9/4652* (2013.01); *G06K 9/6223* (2013.01); *H04N 1/6008* (2013.01)

(58) Field of Classification Search
None
See application file for complete search history.

(56) References Cited

U.S. PATENT DOCUMENTS

| 6,453,056 B2 | 9/2002 | Laumeyer et al. |
| 8,064,643 B2 | 11/2011 | Stein et al. |
| 9,418,303 B2 * | 8/2016 | Zobel ........................ G06K 9/42 |
| 9,524,439 B2 * | 12/2016 | Frenzel .............. G06K 9/00798 |
| 2012/0046855 A1 * | 2/2012 | Wey ................... G08G 1/09623 |
| | | 701/117 |

FOREIGN PATENT DOCUMENTS

| CN | 103389733 A | 11/2013 |
| CN | 103925927 A | 7/2014 |
| CN | 104766046 A | 7/2015 |
| CN | 104850845 A | 8/2015 |

OTHER PUBLICATIONS

Murali et al., "Generation and Usage of Virtual Data for the Development of Perception Algorithms Using Vision," SAE Technical Paper 2016-01-0170, 2016, doi:10.4271/2016-01-0170 (6 pages).
Sathiya et al., "Pattern Recognition Based Detection Recognition of Traffic Sign Using SVM," International Journal of Engineering and Technology (IJET), ISSN: 0975-4024, vol. 6 No. 2 Apr.-May 2014, pp. 1147-1157.

* cited by examiner

*Primary Examiner* — Iman K Kholdebarin
(74) *Attorney, Agent, or Firm* — Frank A. MacKenzie; Bejin Bieneman PLC

(57) ABSTRACT

A computing device, programmed to: acquire a color image and transform the color image into a color-component map. The computer can be further programmed to process the color-component map to detect a traffic sign by determining spatial coincidence and determining temporal consistency between the color-component map and the traffic sign.

20 Claims, 12 Drawing Sheets

1100

US 10,552,692 B2

COLOR LEARNING

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. Safe and comfortable piloting of the vehicle can depend upon acquiring accurate and timely information regarding the vehicles' environment. Computing devices, networks, sensors and controllers can be equipped to analyze their performance, detect when information is not being acquired in an accurate and timely fashion, and take corrective actions including informing an occupant of the vehicle, relinquishing autonomous control or parking the vehicle.

DETAILED DESCRIPTION

Figure 1:
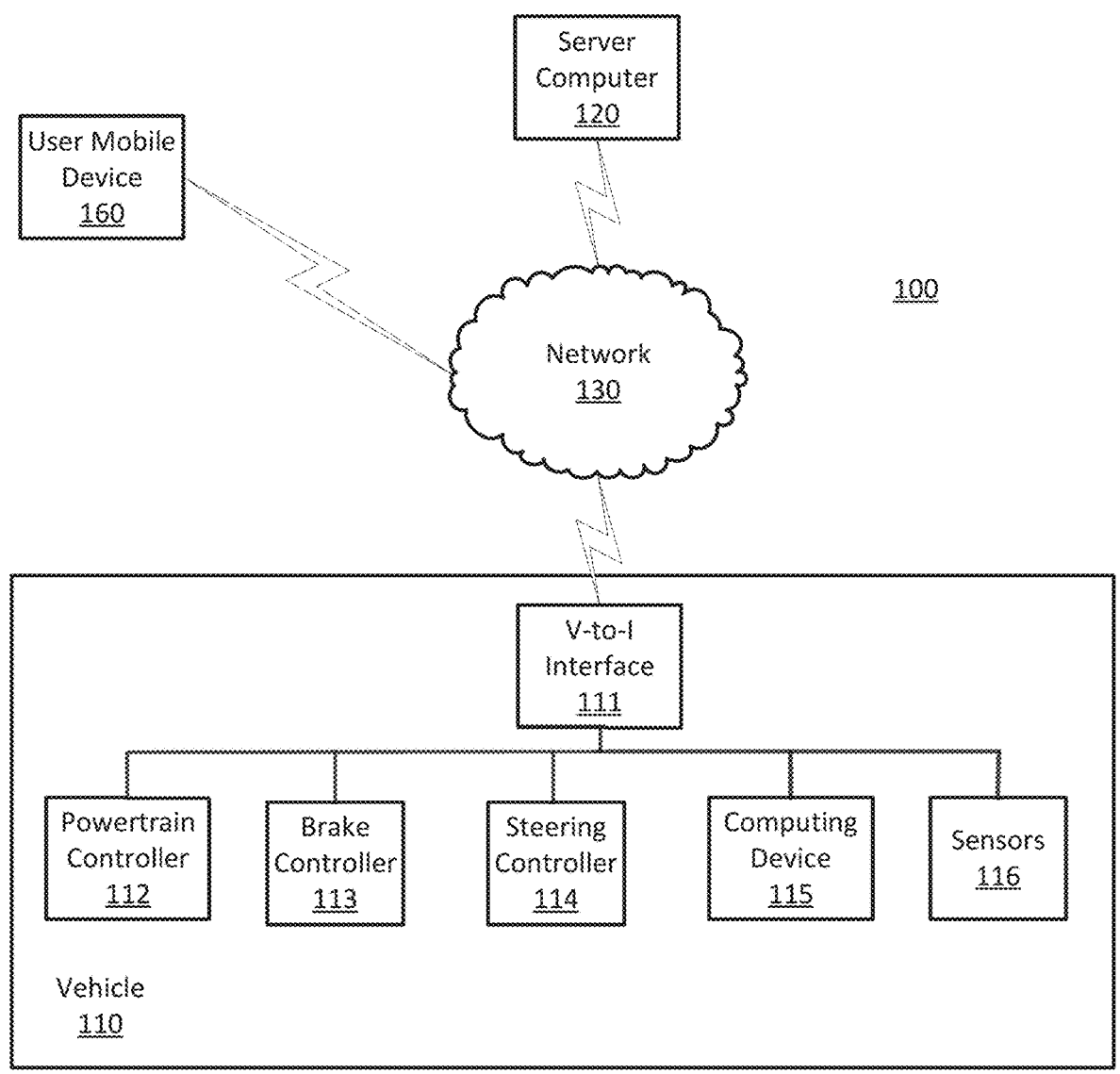
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Disclosed herein is a method, comprising, acquiring a color image, transforming the color image into color-component maps, and, processing the color-component maps to detect a traffic sign by determining spatial coincidence and temporal consistency between the color-component maps and the traffic sign. The color image can be transformed into color-component maps by converting three-element RGB vectors representing pixels of the color image into eleven-element color-name vectors based on RGB to color-name space transforms determined based on training data. Each eleven-element color-name vector can represent a single color. Color bases can be generated by K-means clustering with training data that determines a probability of occurrence of the eleven-element color-name vectors and the training data can include images including traffic signs. The color-component maps can be processed by segmenting the color-component maps using thresholding. Processing the color-component maps can be based on spatial coincidence, wherein segmented color-components are retained based on matching a color-component included in the traffic sign while spatially nearby color-components match color-components included in the traffic sign.

A second color image can be acquired and the second color image can be transformed into second color-component maps, the second color-component maps can be segmented, spatial coincidence determined in the second color-component maps and temporal consistency can be determined based on comparing the color-component maps from the second image to the color-component maps from the first image. Determining temporal consistency can retain color-components that occur in traffic signs in two or more color images acquired at different times. The traffic signs can be detected based on determining optical flow, wherein optical flow predicts where the traffic signs occur based on information regarding sensor movement and a camera lens. Training can include performing k-cluster analysis on color-name vectors. Thresholding the color component maps can be based on Otsu's thresholding technique and Otsu's thresholding technique can produce a binary output image, wherein the binary output image is combined with the color image to produce an output color image.

Further disclosed is a computer readable medium, storing program instructions for executing some or all of the above method steps. Further disclosed is a computer programmed for executing some or all of the above method steps, including a computer apparatus, programmed to acquire a color image, transform the color image into color-component maps, and, process the color-component maps to detect a traffic sign by determining spatial coincidence and temporal consistency between the color-component maps and the traffic sign. The computer can be further programmed to transform the color image into color-component maps to indicate the important color for traffic signs by converting three-element RGB vectors representing pixels of the color image into eleven-element color-name vectors based on RGB to color-name transforms determined based on training data, where each eleven-element color-name vector can represent a single color as output of color space conversion. The computer can be further programmed to determine probabilities based on training data that indicates a probability of occurrence of the eleven-element color-name vectors and the training data can include an image including the traffic sign. The color-component maps can be processed by segmenting the color-component maps using thresholding. Processing the color-component maps can be based on spatial coincidence, wherein segmented color-components are retained based on matching a color-component included in the traffic sign while spatially nearby color-components match color-components included in the traffic sign.

The computer can be further programmed to acquire a second color image and the second color image can be transformed into second color-component maps, the second color-component maps can be segmented, spatial coincidence determined in the second color-component maps and temporal consistency can be determined based on comparing the color-component maps from the second image to the color-component maps from the first image. Determining temporal consistency can retain color-components that occur in traffic signs in two or more color images acquired at different times. The computer can be further programmed to detect traffic signs based on determining optical flow, wherein optical flow predicts where the traffic signs occur based on information regarding sensor movement and a camera lens. Training can include performing k-cluster analysis on color-name vectors. Thresholding the color-component maps can be based on Otsu's thresholding technique and Otsu's thresholding technique can produce a binary output image, wherein the binary output image is combined with the color image to produce an output color image.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Tasks that can be performed by a computing device 115 in a vehicle 110 to improve the ability of computing device 115 to pilot vehicle 110 and assist an occupant in piloting vehicle 110 can include detecting and recognizing traffic signs. Traffic signs can be signs that convey information, instructions or warnings to occupants as they pilot vehicles. Traffic signs can include "speed limit" signs, "do not enter" signs, "one way" signs, and "parking" signs, for example and can provide information that permits safe and legal piloting of a vehicle 110. Traffic signs can be located so as to be visible to occupants piloting a vehicle 110 and can be configured with colors and shapes to be easily recognizable by occupants, for example stop signs. Detecting and recognizing traffic signs can include determining a location of a traffic sign with respect to a vehicle 110 and determining an identity and semantics associated with a traffic sign. For example, detecting and recognizing a "speed limit" sign can include determining that the sign is adjacent to a roadway and therefore applies to a vehicle 110 being piloted on the roadway, and determining that the sign includes the phrase "speed limit 50 MPH", which establishes a maximum legal speed of 50 miles per hour for a vehicle 110 on the roadway.

Figure 2:
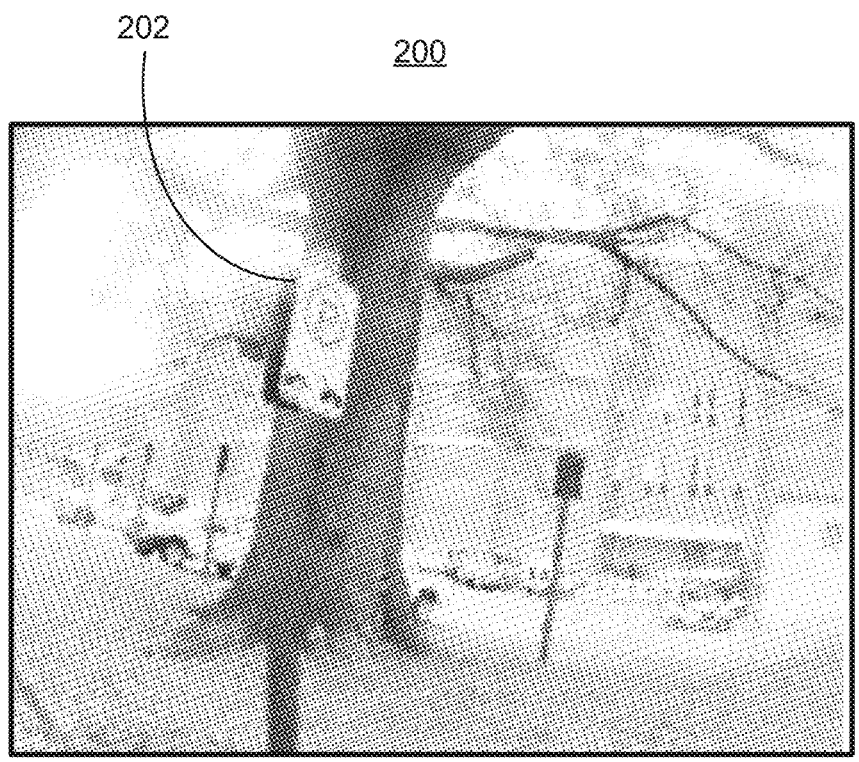
FIG. 2 is a diagram of an example video image including a traffic sign.

FIG. 2 is a black and white rendering of a color image 200 of a scene viewed from a vehicle 110 that includes a traffic sign 202, in this example a "no parking" sign. Color image 200 can be acquired by computing device 115 in a vehicle 110 with a color camera, which can be a color video camera, for example. The color image 200 can be a single frame of color video data or a composite of more than one frame of color video data to improve signal to noise ratio, for example. Color image 200 can be processed by computing device according to techniques disclosed herein to determine that a traffic sign 202 is present in color image 200. Detecting and recognizing traffic sign 202 can assist computing device 115 in piloting vehicle 110 in a safe and legal fashion.

Detect and recognition of traffic signs is facilitated by colors and arrangements of colors used in traffic signs. For example, an octagonal shape having a predominately red color with white letters is usually reserved for "stop" signs while a rectangular shape having a predominant white color with black lettering can be an informational sign like a "speed limit" sign. Other signs, like traffic sign 202 can combine multiple colors, in this example white, black and, red in specific shapes to inform an occupant that no parking is allowed near the traffic sign 202. Techniques disclosed herein advantageously accurately determine the colors included in a color image 200 to detect and recognize traffic signs, for example traffic sign 202.

Figure 3:
FIG. 3 is a diagram of an example color space image encoded as three RGB image planes.

FIG. 3 is a diagram of a black and white rendering of a color image 302, showing how a color image 302 can be represented in computing device 115 memory by three RGB images 304, 306, 308 of image data representing red, green and blue (RGB) color-components of each pixel in color image 302, respectively. Representing a color image 302 using three RGB images 304, 306, 308 corresponding RGB color-components is a technique for representing the full range of colors as perceived by humans. Each color perceived by humans can be approximated by a combination of RGB components, as pigment or light, depending upon whether additive or subtractive colors are used. Combining RGB components can create all colors perceivable by humans, within the limits of resolution of the RGB components.

Representing a color image 302 using three RGB images 304, 306, 308 is one of many representations that can accurately represent a color image 302. Other color representations encode a color image 302 by representing the hue, saturation and intensity (HIS) of each color pixel in a color image 302, for example, to produce a different representation of the color image 302 that also can accurately represent colors as perceived by a human. In other examples disclosed herein, a color image 302 encoded as three RGB images 304, 306, 308, can be re-encoded to represent a color image 302 with 11 image planes, where each of the 11 image planes represents a single color.

Figure 4:
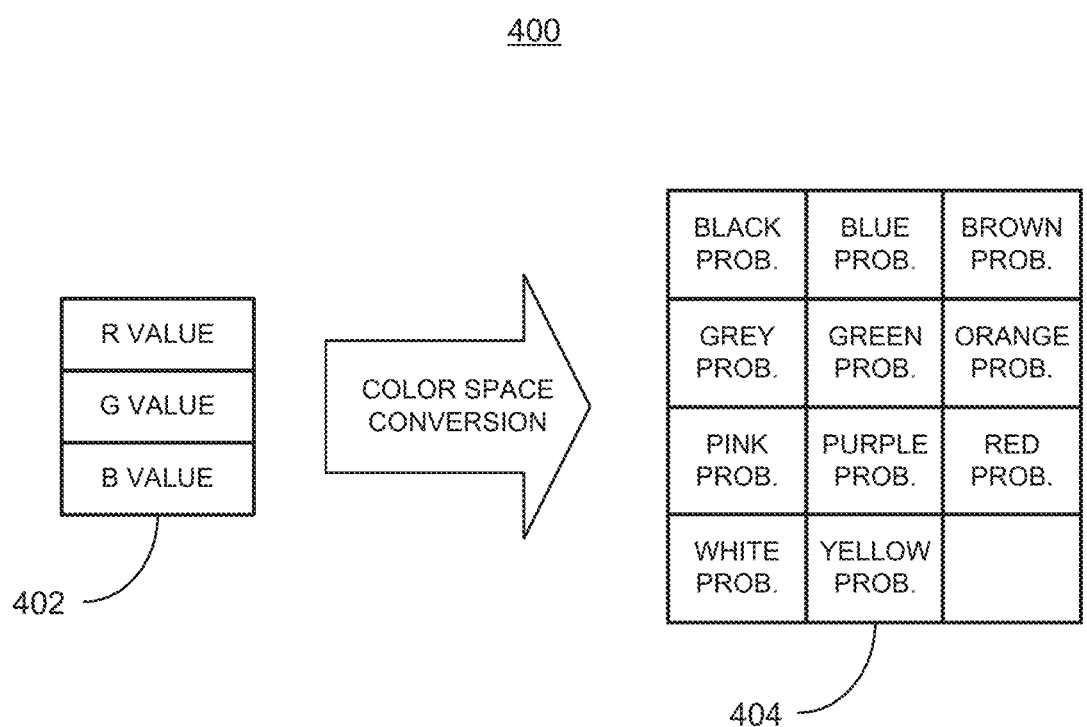
FIG. 4 is a diagram of an example color space conversion from RGB to color-name space.

FIG. 4 is a diagram of a technique for converting three-element RGB vectors representing the color of a pixel in a color image 302 into an 11-element vector by color space conversion 400. The RGB vectors can be transformed into color-name vectors having fewer or more than 11 elements. Selecting an 11-dimensional color-name space having 11 element color-name vectors can adequately span the space of human visual perception with the minimum number of elements that provide good specificity for colors, i.e. colors represented by RGB vectors can be transformed into an 11-element vector having most of the total sum of the 11 elements concentrated in one or two elements. Color space conversion 400 transforms a three-element RGB vector 402 representing a color pixel into an 11-element color-name vector 404, where each element of the 11-element color-name vector 404 is the probability that the values in a three-element RGB vector 402 represent each color of the 11-element color-name vector.

Figure 8:
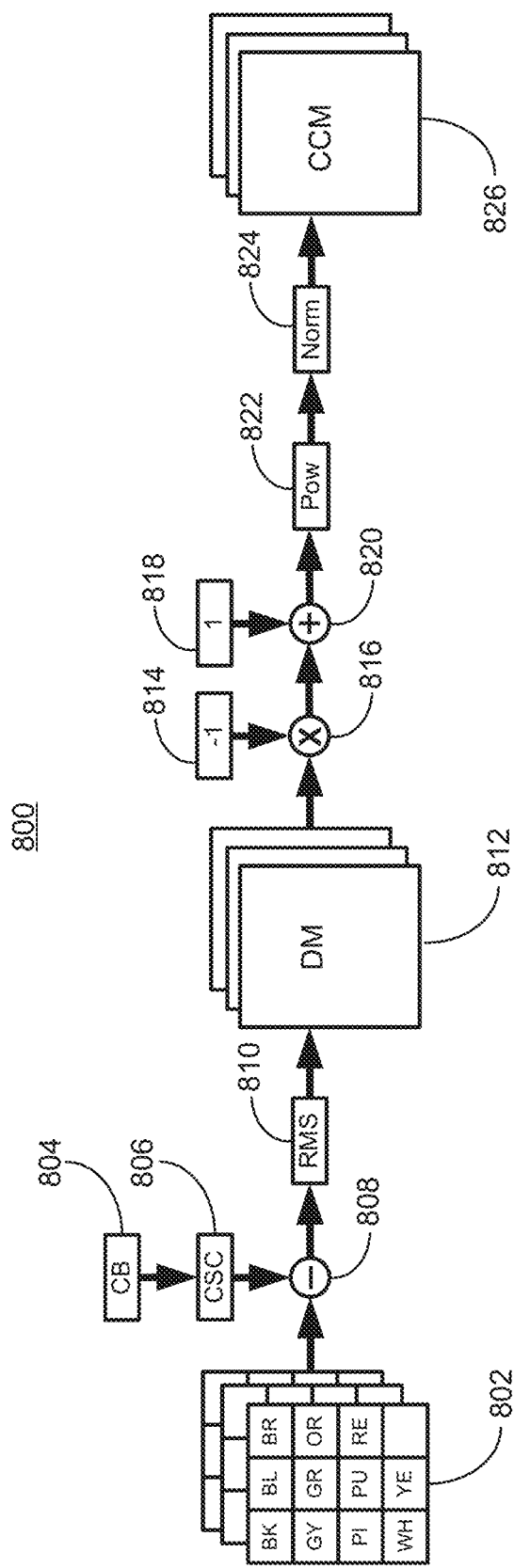
FIG. 8 is a diagram of an example process for generating color component maps.

Each element of the 11-element color-name vector represents a common color, as shown in FIG. 4, namely, black, blue, brown, grey, green, orange, pink, purple, red, white, and yellow. An advantage of transforming a three-element RGB vector 402 into an 11-element color-name vector 404 is that colors can be represented by a vector that has a large value in one element and near-zero values in the other 10 elements of a single pixel. After converting the raw RGB images into color-name images, the color-component maps (CCMs) can be generated by calculating the similarity between the color-name images and color-components, which is shown in FIG. 8. FIG. 8 is an example process 800 for generating color component maps (CCMs) 826 from input color-name vector maps 802. For example, the three color-components of a no-parking sign can be red, black and white. Therefore, three CCMs 826 will be generated for each input image 802 if the targeted traffic sign is the no-parking sign. Each CCM indicates one significant color (red, black or white).

Returning to FIG. 4., color space conversion 400 transform can be pre-trained using color images of natural color scenes to form a transformation matrix. A color image 302 acquired by color video cameras can vary in the RGB values assigned to colors in a scene due to variations in color video cameras and variations in acquisition electronics that can cause color video cameras to acquire different RGB values from the same scene. In other examples, differences in lighting can cause different RGB values to be acquired in response to the same colors. In order to compensate for these difference, among others, the transformation matrix is obtained from training with natural color images in an off-line manner, and use that to transform the 3-element RGB vectors 402 to 11-element color-name vectors 404. The traffic signs and each color present in traffic signs can be trained using k-means clustering to determine clusters of groups of pixels that represent the same color, which are color-components of the traffic sign.

Figure 9:
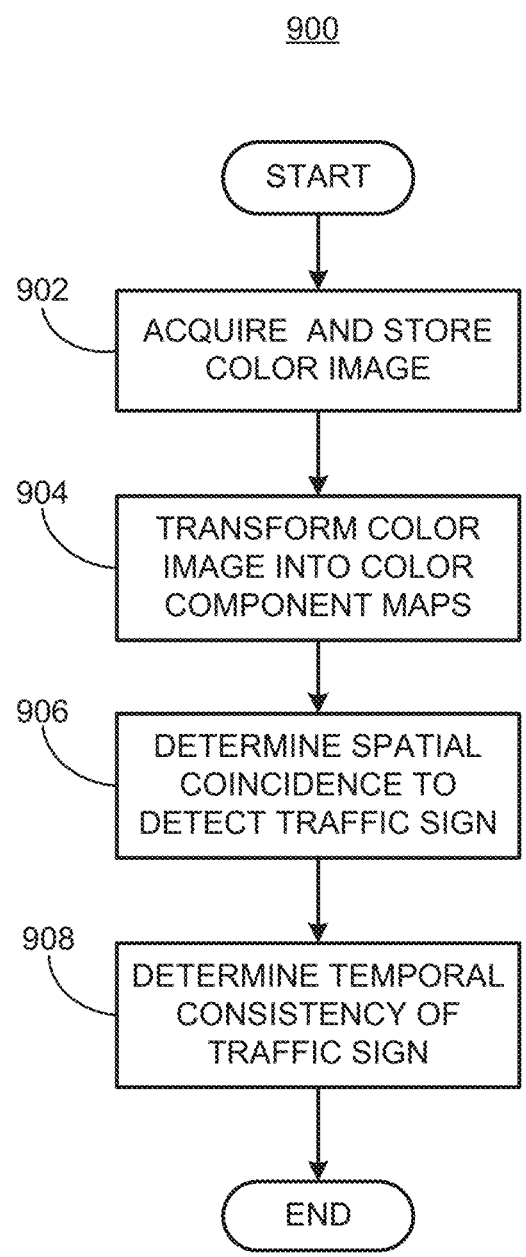
FIG. 9 is a flowchart diagram of an example process to detect traffic signs with color processing.

K-means clustering is an unsupervised learning technique that groups data based on partitioning data into discrete clusters by determining K centroids (also denoted as color bases) in the color space and then determines probabilities that a particular color represented by an 11-element color-name vector 404 (e.g. K=3 for no-parking sign) belongs to a particular color group by measuring the distance of 11-element color-name vector 404 from the 11-dimensional centroids of the clusters and thereby assigning the element to the closest cluster. The clusters (colors) can be iteratively determined to maximize the distance between clusters and minimize the number of incorrectly assign elements. The block diagram is shown in FIG. 9. K-means clustering with traffic sign images can further reduce the variations in acquisition electronics since the color-components are trained using cropped traffic sign images. By inputting training data from natural images with different variation, transform parameters that produce 11-element color-name vectors 404 from 3-element RGB vectors 402 can be determined. Using the determined transforms, 3-element RGB vectors 402 can be transformed into 11-element color-name vectors 404, thereby transforming a color image represented by three (RGB) image planes into 11 color-name planes. The color-components, which indicate the most important colors of the targeted traffic sign, can be determined by K-means clustering. Color-component maps (CCMs) can be determined by calculating the similarity between color-name images and color-components, which is shown at FIG. 8. Each single value in CCMs shows the similarity between the color-component and the color-name image; each CCM has the same X, Y size as the input color image 200.

Figure 5:
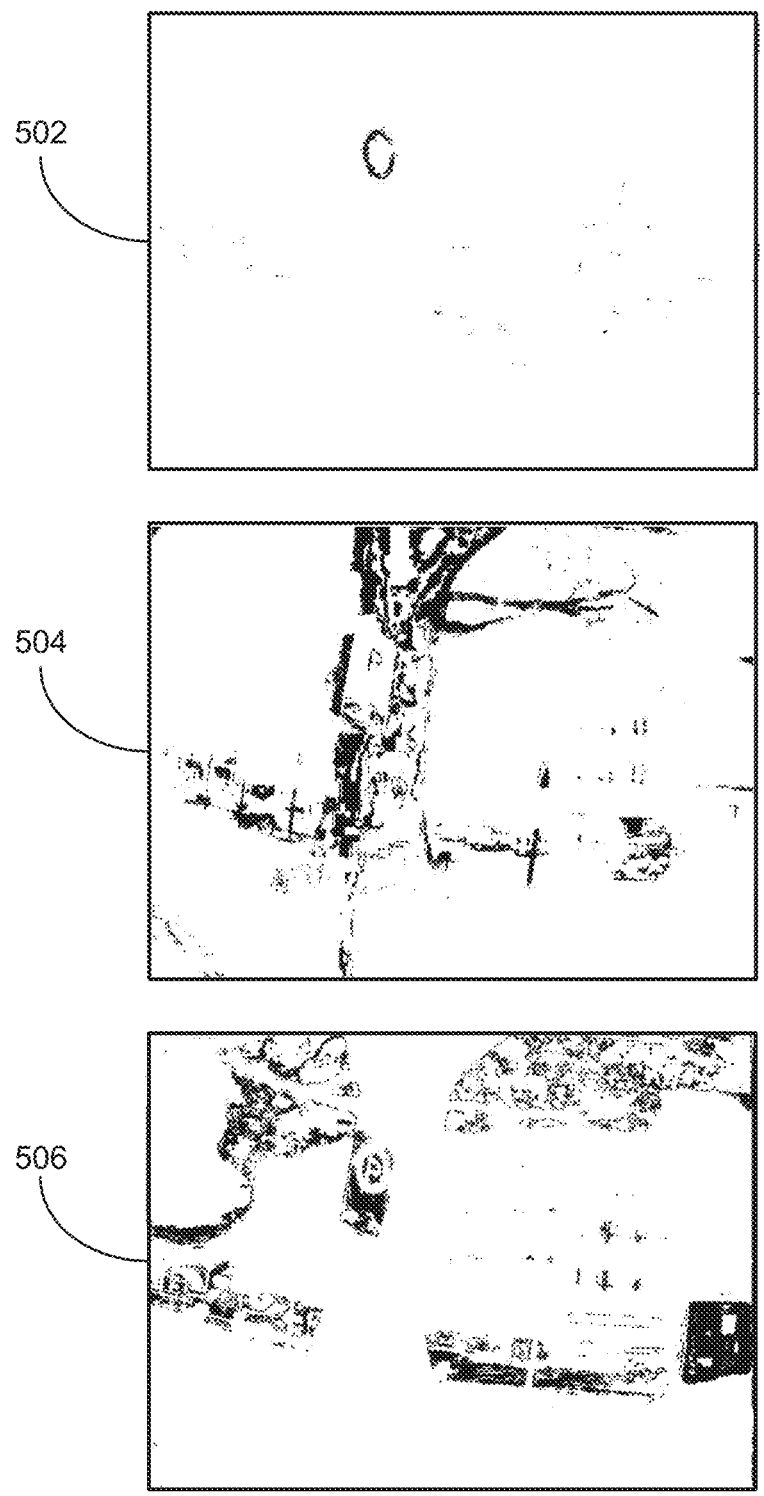
FIG. 5 is a diagram of three example color-component maps.

Each CCM represents the similarity to one color-component of the traffic sign. An advantage of this representation is that for colors of interest in traffic signs, each color can be represented by a CCM with a large value in one plane and zeros otherwise, making identification of traffic signs by color very efficient. FIG. 5 is a diagram of three color-component maps derived from color image 200 from FIG. 2 using the CCM generation module as described above. The three color-component maps 502, 504, 506 in FIG. 5 represent a "red" color-component map 502, a "black" color-component map 504, and a "white" color-component map 506, all derived from color image 200. The "1" pixels of "red" color-component map 502, "black" color-component map 504, and "white" color-component map 506 represent the probabilities that pixels at that position in the color image 200 are red, black, or white, respectively. The color-component maps 502, 504, 506 are formed by first transforming the RGB pixels in color image 200 into color-name images as described above, calculating root-mean-square errors from color bases, and then the values are multiplied by −1, added to 1 and then calculated as powers of e, or natural logarithms to make higher values represent shorter distances in the 11-dimension color space as shown in relation to FIG. 8.

Figure 6:
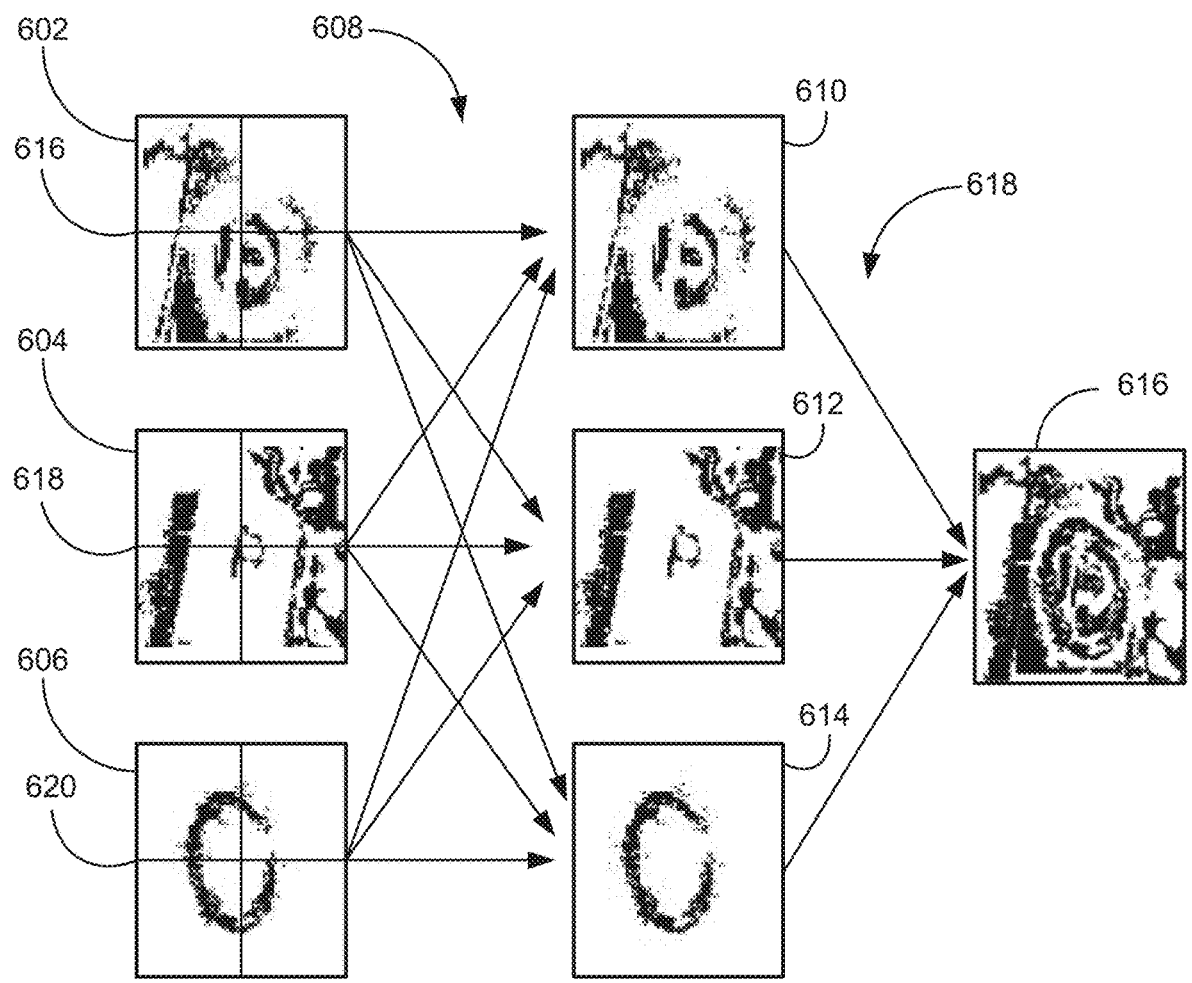
FIG. 6 is a diagram of example spatial coincidence processing applied to color-component maps.

FIG. 6 is a diagram showing how spatial coincidence among color-component maps can be used to strengthen the identification of colors in an acquired color image. First, the color-component map s 602, 604, 606 are thresholded to suppress low-valued color probabilities using Otsu's thresholding to form binary results. Thresholding means converting each pixel of an input image, in this case color-component map s 602, 604, 606, from a value that can range from 0 to a maximum value into a binary value that can be either 0 or 1 depending upon whether the pixel value is greater or less than a predetermined threshold value. Otsu's thresholding assumes that the color probabilities in each color-component map 602, 604, 606 are derived from binary distributions and forms a binary image where each pixel is converted to a 1 or a 0 depending upon which binary distribution it is determined to be derived from. The binary outputs are then combined algebraically to confirm that all of the colors that occur in a traffic sign 202 are found in the same region by applying a moving window to the binary color-component maps to form input windows 602, 604, 606 as shown in FIG. 6.

The three input windows 602, 604, 606 of FIG. 6 surround corresponding points of three binary color-component map s corresponding to "red", "black" and "white" colors, respectively. In order to occur as a "1" in an output window 610, 612, 614, the pixel must not only be a "1" in the input window 602, 604, 606 but must also have at least one "1" occurring somewhere in the two other input windows 602, 604, 606 corresponding to the two other colors. This means that each "1" pixel in the output windows 610, 612, 614 is likely to represent a traffic sign because all of the colors included in a given traffic sign 202 are included in a region near the pixel. This operation is denoted by the arrows 608 showing that each output window 610, 612, 614 is an algebraic combination of three input windows 602, 604, 606. In addition, the three input windows 602, 604, 606 are respectively divided into quadrants 616, 618, 620, and each quadrant is required to have at least one non-zero pixel in order for the pixel to be output as a "1" in one of the output windows 610, 612, 620. Following this step, the three output windows 610, 612, 614 are combined 618 by taking the logical OR of the three output windows 610, 612, 614 to form one output image 616 that represents the pixels belonging to traffic sign 202.

Figure 7:
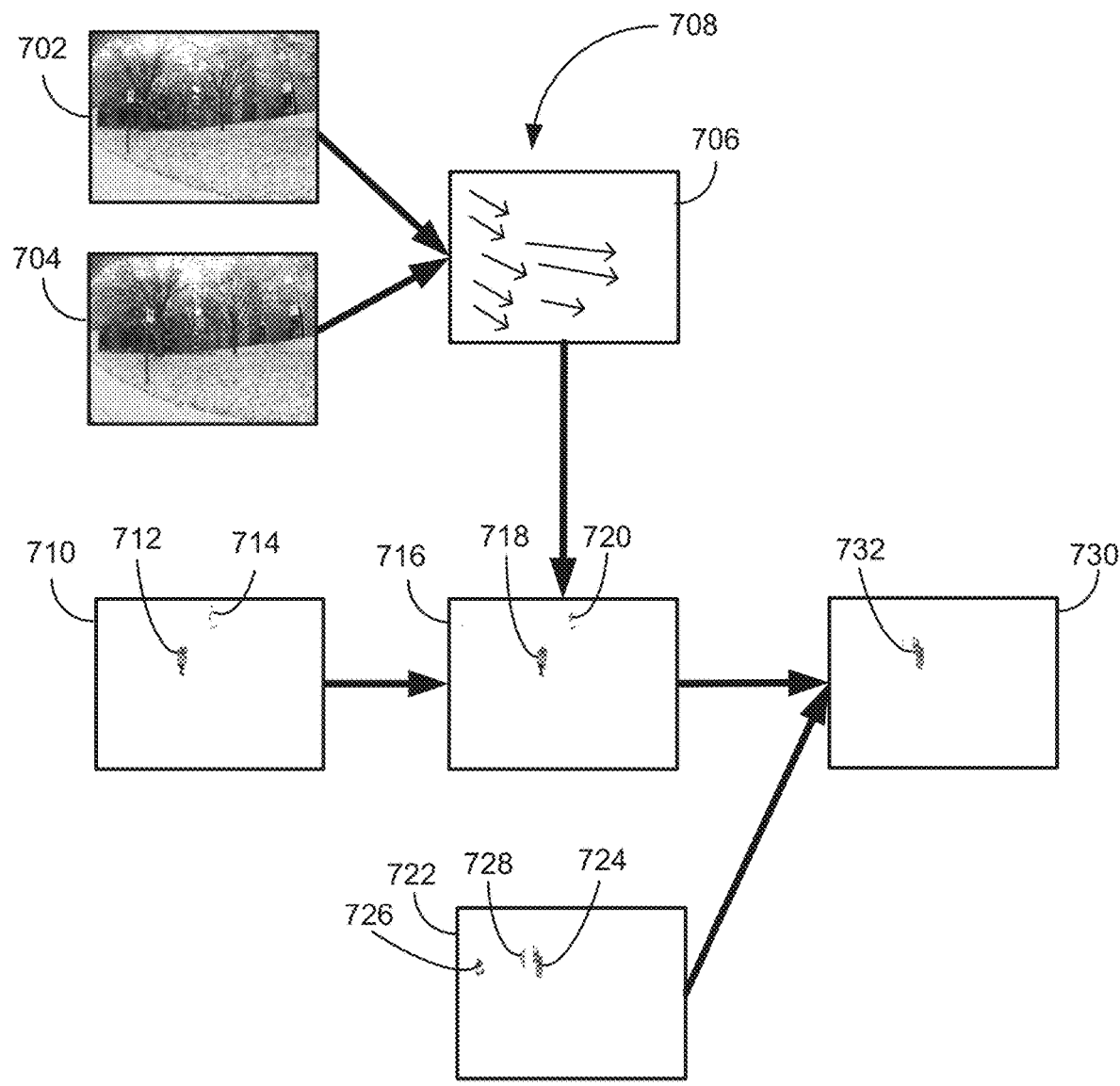
FIG. 7 is a diagram of example temporal consistency processing applied to color-component maps.

FIG. 7 is a diagram of temporal consistency processing applied to two or more output images 710, 722 formed from input color images 702, 704 acquired at different times as a vehicle 110 is piloted. Optical flow processing is first applied to input color images 702, 704. Optical flow processing can determine where objects in a scene translate within input color images 702, 704 based on information regarding the location of the camera and the direction the camera was pointed at the time the color images 702, 704 were acquired, along with parameters of the camera lens including magnification. Optical flow processing relies on detecting features based on objects in an acquired color image 702, for example, with machine vision techniques that determine the same features in a first acquired color image 702 and a second acquired color image, 704, for example. Optical flow processing can determine how features and the objects from which the feature are derived translate within color images 702, 704 based on determining the movement of the camera in space in the time between acquiring color images 702, 704.

Optical flow processing applied to input color images 702, 704 is illustrated by optical flow image 706 that includes optical flow arrows 708 representing the movement of features between the two input color images 702, 704. The optical flow arrows 708 can be determined by computing device 115 based on sensors 116 that detect motion of the vehicle 110, including accelerometers and GPS, for example, combined with information regarding the magnification of the camera lens. By determining the video camera movement in space between acquiring the two color images 702, 704, and knowing the magnification of the lens, the change in location of a feature in the two color images 702, 704 can be predicted. The change in location of detected features in color images 702, 704 is shown by optical flow arrows 708.

Temporal consistency processing performs optical flow processing to two or more input color images 702, 704 acquired at different times, to form optical flow image 706 including optical flow arrows 708. In addition, input color images 702, 704 can be processed by spatial coincidence processing as discussed in relation to FIG. 6 to produce output images 710, 722. Optical flow arrows 708, denoting motion of features between input color images 702, 704 can be applied to output image 710 to translate detected color objects 712, 714, to form output image 716 including color objects corresponding to a traffic sign 718 and extraneous color noise 720. Translating color objects 712, 714 according to optical flow arrows 708 from optical flow image 706 can separate color objects 712, 714 that correspond to real objects in space, like traffic sign 718 from extraneous noise 728, 726, because real objects in space will translate according to determined optical flow, while extraneous noise will not.

Output image 722 includes color objects corresponding to a traffic sign 724, and extraneous noise 728, 726. Output image 730 is formed by taking the logical AND of output image 722 and translated output image 716. Since traffic sign 718, 724 occurs in both output images 716, 722 and has been translated according to optical flow arrows 708, the traffic sign 718, 724 will occur at the same location in each image and therefore will occur in output image 730 as traffic sign 732. Extraneous noise 720, 726, 728 does not occur in both output images 716, 722 at a same location in the images, and so will not occur in output image 730. In this fashion, temporal consistency processing can predict where the pixels representing a traffic sign 718, 724 can occur in output images 716, 722 based on optical flow processing applied to the acquired color images 702, 720, since random extraneous noise pixels do not move according to optical flow processing, they can be filtered out by this process, while pixels associated with a traffic sign 718, 724, survive filtering to occur as traffic sign 732 pixels in output image 730.

Computing device 115 can determine the location and direction of cameras included in a vehicle 110 by acquiring information from sensors 116 like accelerometers, electronic compasses and GPS, and combine this with information regarding the magnification of the camera lens to predict where the feature will move between color images 702, 704, acquired at different times. Predicting the locations of one or more features associated with a traffic sign 728 can be used to confirm that pixels associated with a traffic sign 718, 722 represent a same sign and are therefore temporally consistent. Optical flow processing can determine temporal consistency of objects detected by spatial coincidence, meaning that the detected objects represent the same object (a traffic sign) in two or more color images 702, 704, based on both spatial coincidence and temporal consistency.

FIG. 8 is an example process 800 for generating color component maps (CCMs) 826 (CCMs generation) from input color-name vector maps 802. For example, the three color-components of a no-parking sign can be red, black and white. Therefore, three CCMs 826 will be generated for each input color-name space image 802 if the targeted traffic sign is the no-parking sign. Each CCM 826 plane indicates one significant color (red, black or white). At subtraction stage 808, input color-name vector maps 802 are normalized by subtracting out the color base 804, which is formed by the process 1000, and processed by color space conversion 806 prior to subtracting from input color-name vector maps 802.

At stage 810, computing device 115 can calculate the root-mean-square error of each point in input color-name vector maps 802 from each color in the three color-components of a no-parking sign, for example, and output the results to distance maps 812. The distance maps can be made more tractable for calculation by multiplying each element of distance maps 812 by −1 814 at multiply stage 816, and then adding a 1 to each element of distance maps 812, prior to forming the power of each element of distance maps 812. Following this stage, the powered elements can be normalized again by subtracting out the average over one or more frames of data, for example, at normalization stage 824. Following normalization stage 814, CCM 826 can be output for further processing to computing device 115, for example spatial coincidence processing as described in relation to FIG. 6

FIG. 9 is a diagram of a flowchart, described in relation to FIGS. 2-7, of a process 900 for detecting traffic signs. Process 900 can be implemented by a processor of computing device 115, taking as input information from sensors 116, and executing instructions and sending control signals via controllers 112, 113, 114, for example. Process 900 includes multiple steps taken in the disclosed order. Process 900 alternatively could include implementations including fewer steps or can include the steps taken in different orders.

Process 900 begins at step 902, where a computing device 115 in a vehicle 110 can acquire and store a color image 702. As discussed above in relation to FIG. 2, color image 702 can be acquired as one or more frames of color video data from a color video camera, for example. At step 904, the pixels of color image 702, represented by three-element RGB vectors 402 can be converted into 11-element color-name vectors 404 by trained color space conversion 400 as discussed above in relation to FIGS. 3 and 4. The 11-element color vectors 404 form color coordinate maps (CCMs) 502, 504, 506 corresponding to the colors found in traffic signs by the framework (CCMs generation) as shown in FIG. 8.

At step 906, the CCMs representing the colors found in traffic signs are combined with spatial coincidence processing as discussed above in relation to FIGS. 5 and 6 to form and output image 706 that includes pixels representing a traffic sign 708. Spatial coincidence processing requires that pixels representing a traffic sign 708 include nearby colors that have been predetermined to be included in a traffic sign in order to be determined to be pixels representing a traffic sign 708. This processing filters out pixels that may include a color included in a traffic sign but are not spatially near the other colors included in the traffic sign.

At step 908, computing device 115 can translate the output image 706 to form a translated output image 714 and combine the translated output image 714 with an output image 732 formed by processing a color image 720 acquired at a different time than color image 702 according to translations determined by optical flow processing to require temporal consistency. In this fashion, pixels representing a traffic sign 716 are required to appear in more than one output image at a similar location after translation as discussed above in relation to FIG. 7.

At step 908, pixels representing detected traffic signs 740 can be output by computing device 115 to be used to pilot vehicle 110 or assist an occupant in piloting a vehicle 110. Following this step 908 process 900 ends.

Figure 10:
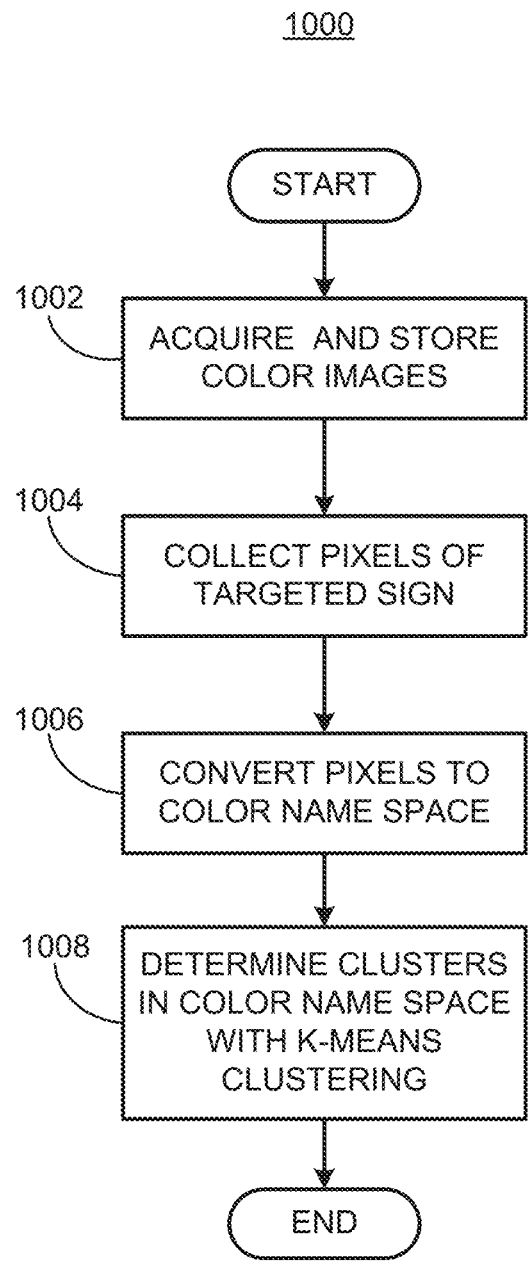
FIG. 10 is a flowchart diagram of an example process to train color-component clusters.

FIG. 10 is a diagram of a flowchart, described in relation to FIGS. 4 and 5, of a process 1000 for training color-component bases for traffic signs. Process 1000 can be implemented by a processor of computing device 115, taking as input information from sensors 116, and executing instructions and sending control signals via controllers 112, 113, 114, for example. Process 1000 includes multiple steps taken in the disclosed order. Process 1000 also includes implementations including fewer steps or can include the steps taken in different orders.

Process 1000 begins at step 1002, where a computing device 115 acquires and stores a plurality of color images 200 that include traffic signs 202. Process 1000 is an example of unsupervised learning, where no labels are available in input color images 200.

At step 1004 the pixels that represent traffic signs 202 are selected by a human operator and all other pixels of the image are set to zero. In other examples, the traffic signs 202 in color images 200 can be selected by a computing device 115 using machine vision techniques.

At step 1006, the selected pixels are converted from a three-element RGB vector 402 to an 11-element color vector 404 as discussed in relation to FIG. 4. At step 1008 the 11-element color vectors 404 are grouped into clusters of similarly colored pixels using K-means clustering as described above. Grouping the similarly colored pixels can produce parameters used to modify the color space conversion transformation to reliably and accurately group pixels associated with traffic signs into the same groups. In this fashion the color bases with variations can be trained into the same groups, thereby making detection of traffic signs acquired under differing conditions more accurate and repeatable. The modified color space conversion parameters can be stored by computing device 115 to be used in processing acquired color images. Following this step 1008, the process 1000 ends.

Figure 11:
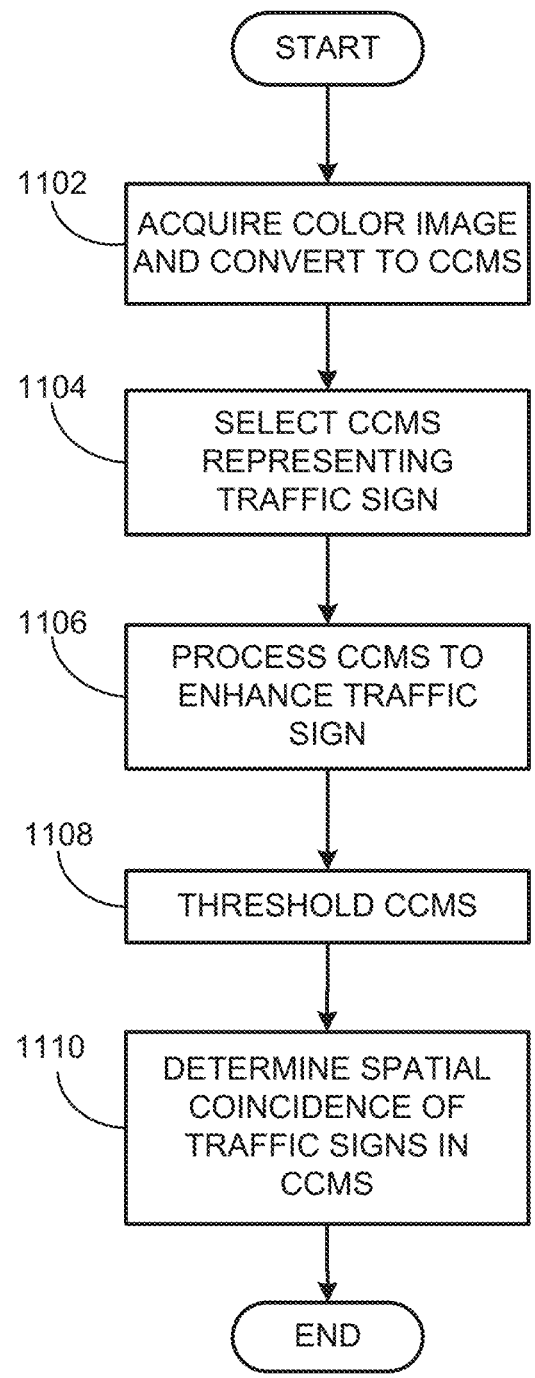
FIG. 11 is a flowchart diagram of an example process to detect traffic signs by determining spatial coincidence.

FIG. 11 is a diagram of a flowchart, described in relation to FIGS. 1-7, of a process 1100 for performing spatial coincidence processing on acquired color images 200. Process 1100 can be implemented by a processor of computing device 115, taking as input information from sensors 116, and executing instructions and sending control signals via controllers 112, 113, 114, for example. Process 1100 includes multiple steps taken in the disclosed order. Process 1100 also includes implementations including fewer steps or can include the steps taken in different orders.

Process 1100 begins at step 1102, where a computing device 115 can acquire a color image 200 as described above in relation to FIG. 2. The color image 200 is converted into color-component maps representing the colors included in color image 200 by performing color space conversion using a trained color space conversion transform and then computing the similarity to a predetermined traffic sign as discussed above in relation to FIG. 9.

At step 1104 the CCMs are calculated representing the traffic sign to be detected. For example, if a "no parking" traffic sign is to be detected, the CCMs representing the colors "red", "black" and "white" can be generated.

At step 1106 the CCMs representing the desired colors can be enhanced as discussed in relation to FIG. 6, namely multiplying by −1, adding 1 and taking the anti-log of the resulting value to condition the values in the CCM for further processing.

At step 1108 the enhanced CCMs can be thresholded, as discussed above in relation to FIG. 6 to form binary images, where each value in the image is either "0" or "1." Following this step, at step 1110 the binary CCMs representing the colors can be combined as discussed in relation to FIG. 6 to only retain as "1s" those pixels that occur in spatial coincidence with other colors from the traffic sign. Following this step, the process 1100 ends.

Figure 12:
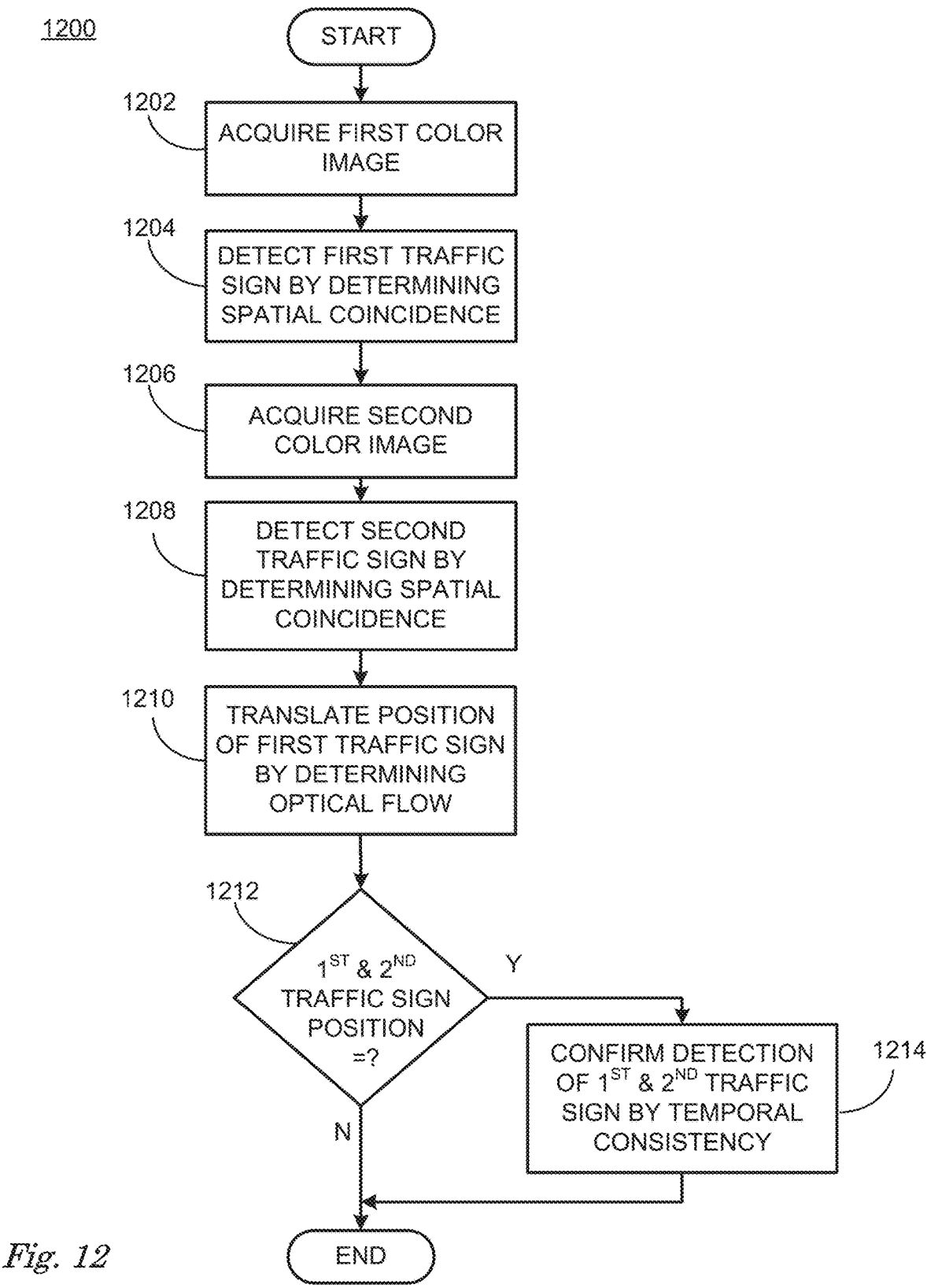
FIG. 12 is a flowchart diagram of an example process to detect traffic signs by determining temporal consistency.

FIG. 12 is a diagram of a flowchart, described in relation to FIGS. 1-7, of a process 1200 for performing temporal consistency processing. Process 1200 can be implemented by a processor of computing device 115, taking as input information from sensors 116, and executing instructions and sending control signals via controllers 112, 113, 114, for example. Process 1200 includes multiple steps taken in the disclosed order. Process 1200 also includes implementations including fewer steps or can include the steps taken in different orders.

Process 1200 begins at step 1202, where a color image 702 is acquired and stored by a computing device 115.

At step 1204 the color image 702 can be processed using spatial coincidence processing as described above in relation to FIGS. 4, 5, 6, 9 and 10 to produce a binary output image 706.

At step 1206 computing device 115 can acquire and store a second color image 720 and at step 1208 the second color image 720 can be processed using spatial coincidence processing to produce a second binary output image 724.

At step 1210 computing device can determine optical flow parameters of features associated with traffic signs in the input color images 702, 720 to determine translation parameters to apply to the binary output images 706, 720 as discussed above in relation to FIG. 7. Either binary output image 706, 720 can be translated to match the other, as long as the pixels representing the traffic signs 716, 732 are brought into alignment so that the pixels representing the traffic signs 716, 732 demonstrate temporal consistency when the motion of the camera is compensated for by determined optical flow parameters.

Temporal consistency is checked at step 1212, where forming the logical AND of the binary output images 706, 720 can determine if the positions of the pixels representing the traffic signs 716, 732 occur in the same location. If the answer is "yes", process 1200 branches to step 1214 where the detection of a traffic sign 202 is confirmed by non-zero output from the logical AND between the binary output image 706, 720. In the case where no non-zero pixels are output from the logical AND process, the "no" branch is taken and process 1200 ends.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   acquiring a color image;
   transforming the color image into color-component maps; and
   processing the color-component maps to detect a traffic sign by determining spatial coincidence and temporal consistency between the color-component maps and the traffic sign.

2. The method of claim 1, further comprising transforming the color image into color-component maps by converting three-element RGB vectors representing pixels of the color image into eleven-element color-name vectors based on RGB to color-component transforms.

3. The method of claim 2, wherein each eleven-element color-name vector represents a single color.

4. The method of claim 3, wherein color bases are generated by K-means clustering with training data that determines a probability of occurrence of the eleven-element color-name vectors.

5. The method of claim 4, wherein the training data includes images including traffic signs.

6. The method of claim 1, further comprising processing the color-component maps by segmenting the color-component maps using thresholding.

7. The method of claim 1, further comprising processing the color-component maps based on spatial coincidence, wherein segmented color-components are retained based on matching a color-component included in the traffic sign while spatially nearby color-components match color-components included in the traffic sign.

8. The method of claim 7, further comprising: acquiring a second color image, transforming the second color image into second color-component maps, segmenting the second color-component maps, determining spatial coincidence and determining temporal consistency based on comparing the color component maps from the second image to the color-component maps from the first image.

9. The method of claim 8, wherein determining temporal consistency retains color-components that occur in traffic signs in two or more color images acquired at different times.

10. The method of claim 9, wherein the traffic signs are detected based on determining optical flow, wherein optical flow predicts where the traffic signs occur based on information regarding sensor movement and a camera lens.

11. A computer, comprising a processor and a memory, the memory including instructions executable by the processor to:
    acquire a color image;
    transform the color image into color-component maps; and
    process the color-component maps to detect a traffic sign by determining spatial coincidence and temporal consistency between the color-component maps and the traffic sign.

12. The computer of claim 11, the instructions further including instructions executable by the processor to transform the color image into color-component maps by converting three-element RGB vectors representing pixels of the color image into eleven-element color-name vectors based on RGB to color-component transform.

13. The computer of claim 12, wherein each eleven-element color-name vector represents a single color.

14. The computer of claim 13, wherein color bases are generated by K-means clustering with training data that determines a probability of occurrence of the eleven-element color-name vectors.

15. The computer of claim 14, wherein the training data includes images including traffic signs.

16. The computer of claim 11, the instructions further including instructions executable by the processor to process the color-component maps by segmenting the color-component maps using thresholding.

17. The computer of claim 11, the instructions further including instructions executable by the processor to process the color-component maps based on spatial coincidence, wherein segmented color-components are retained based on matching a color-component included in the traffic sign while spatially nearby color-components match color-components included in the traffic sign.

18. The computer of claim 17, the instructions further including instructions executable by the processor to: acquire a second color image, transform the second color image into second color-component maps, segment the second color-component maps, determine spatial coincidence in the second color-component maps and determine temporal consistency based on comparing the second color-component maps to the color-component maps.

19. The computer of claim 18, wherein determining temporal consistency retains color-components that occur in traffic signs in two or more color images acquired at different times.

20. The computer of claim 19, the instructions further comprising instructions executable by the processor to detect the traffic signs based on determining optical flow, wherein optical flow predicts where the traffic signs occur based on information regarding sensor movement and a camera lens.

* * * * *